April 13, 1937.  G. LA V. RUNKLE  2,076,866
COT FASTENER
Filed July 28, 1934  2 Sheets-Sheet 1
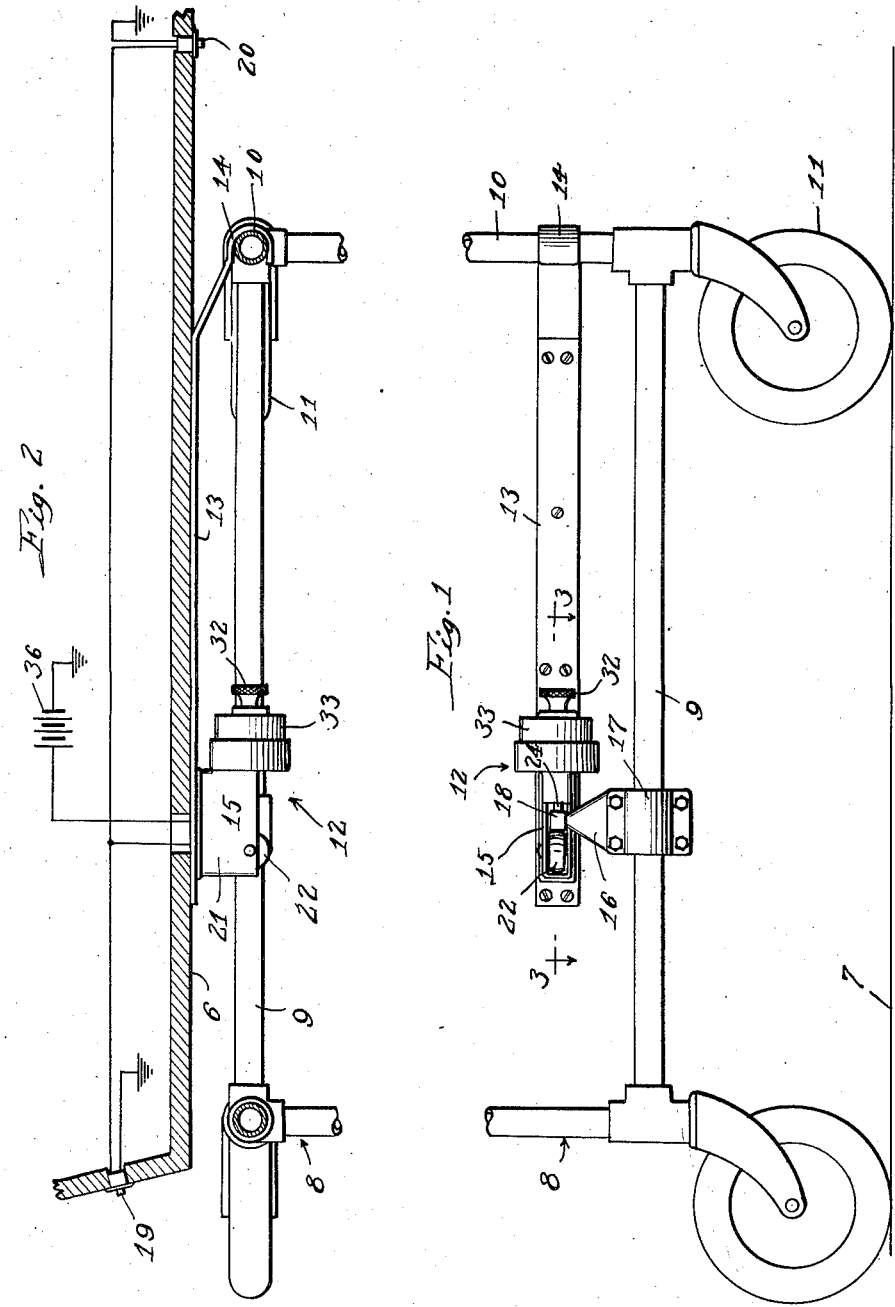

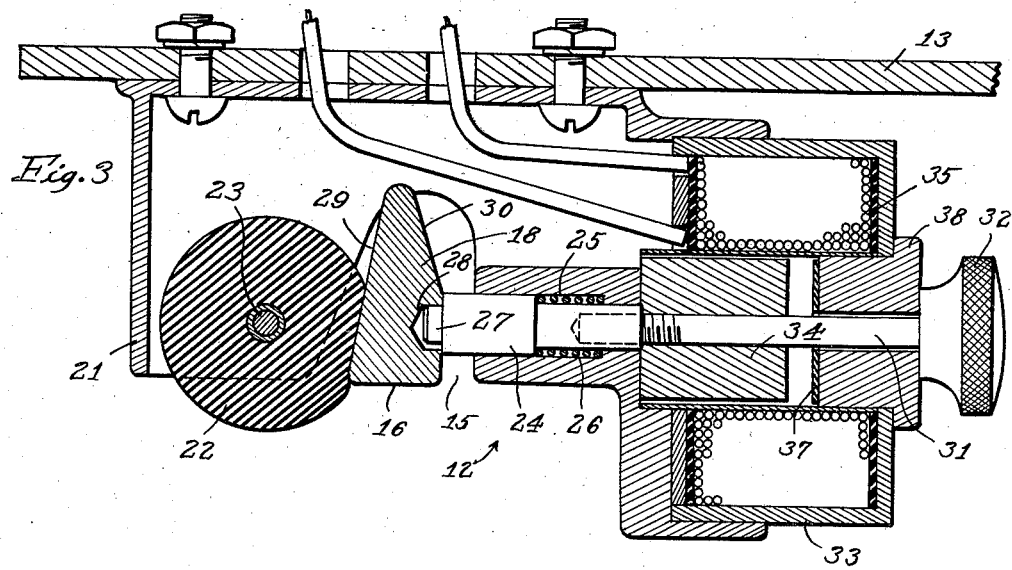
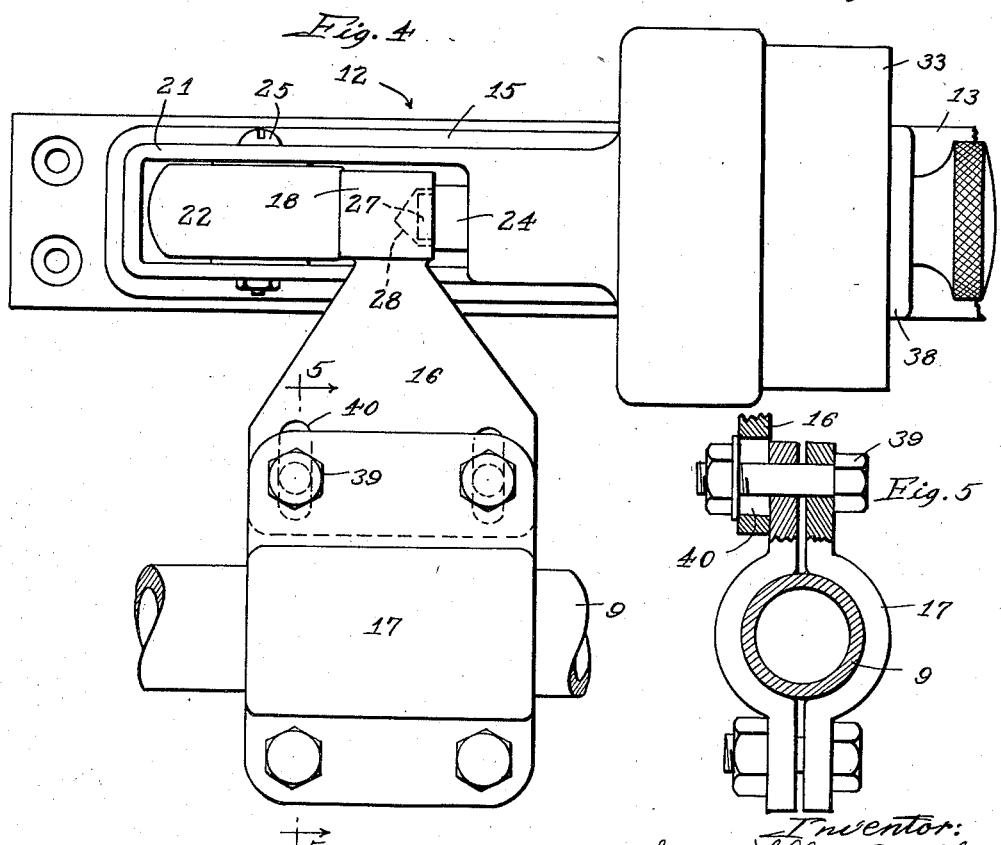

Patented Apr. 13, 1937

2,076,866

UNITED STATES PATENT OFFICE 2,076,866

COT FASTENER

George La Verne Runkle, Freeport, Ill., assignor to Henney Motor Company, Freeport, Ill., a corporation of Delaware Application July 28, 1934, Serial No. 737,344

31 Claims. (Cl. 296—19)

This invention relates to cot fasteners for ambulances and other vehicles.

The principal object of my invention is to provide a cot fastener which is quick, convenient, and positive in the locking and releasing of a cot, and which is not dependent upon the manual operation of a locking member, but, instead, embodies an electrical solenoid controlled latch that is spring pressed toward locking position and arranged to be released magnetically, whereby to be operable automatically and with equal facility from either end of the cot for side or rear loading and unloading.

A further object is to provide an improved locking mechanism for a cot fastener embodying a rubber roller which, in the locking of the cot, is subjected to compression for the purpose of eliminating play and consequent rattle while the cot is in locked position, and for the further purpose of impelling the cot away from the wall at the instant of its release, whereby to eliminate extra operations and facilitate removal of the cot.

The invention is described hereinafter by reference to the accompanying drawings, wherein—

Figure 1 is a side view of the lower portion of a cot illustrating my improved cot fastener in connection therewith;

Fig. 2 is a plan view of Figure 1, showing the electrical controls;

Fig. 3 is a horizontal section on the line 3—3 of Figure 1, showing the locking mechanism on a larger scale;

Fig. 4 is a side view of said mechanism, and

Fig. 5 is a sectional detail on the line 5—5 of Fig. 4.

The same reference numerals are applied to corresponding parts throughout the views.

Referring first Figs. 1 and 2, the numerals 6 and 7 designate the side wall and floor, respectively, of the ambulance or other vehicle in which the cot, a portion of which appears at 8, is to be fastened in place. The cot shown is of a conventional form having horizontal side bars 9 and corner posts or legs 10, and provided with the usual wheels 11 to permit it to be rolled into and out of place in the ambulance. The wheels are swiveled for caster action to permit sidewise movement of the cot, which is required in the locking and releasing of the cot, as will soon appear.

The cot fastener of my invention is indicated generally by the numeral 12, and, briefly stated, comprises a frame 13 mounted on the side wall of the ambulance and having a hook 14 on one end to engage one corner post or leg 10 of the cot, and locking mechanism 15 on the other end to cooperate with a lug 16 clamped, as at 17, onto one horizontal side bar 9 of the cot. In the locking of the cot, it is first hooked at 14 and then swung sidewise into place to be locked at 15—16. The locking mechanism is of an electrical solenoid type arranged to be locked automatically by the mere entry of the wedge-shaped tooth 18 on the upper end of the lug 16 in the locking mechanism, and arranged to be automatically released by merely pressing the button of a control switch, several of which will be provided at strategic positions in the vehicle, as shown, for example, at 19 and 20 in Fig. 2. The particular arrangement shown enables the releasing of the cot from either end with equal facility for side or rear loading and unloading. From this much description, it will be seen that the present invention avoids the necessity for hand operation of locking parts, so as to save time in the locking and releasing of the cot, which, of course, is highly important in emergencies. Furthermore, many of the hand operated fasteners were objectionable because they were awkward to reach and manipulate, and, as a result, the cot might not be fastened securely. The present fastener reduces to a minimum the possibilities of failure to fasten, and is practically fool proof.

Referring to Figs. 3 and 4, the locking mechanism 15 is illustrated as comprising a housing 21, in one end of which a rubber roller 22 is mounted for rotation on a vertical axis, as on bolt 23. A latch 24 is reciprocable in a guide 25 provided in the other end of the housing 21 and is normally urged toward the roller by a coiled compression spring 26 whereby to engage the reduced end portion 27 of the latch in a socket 28 provided therefor in one side of the wedge-shaped tooth 18, previously mentioned. The tooth 18 presents one inclined side 29 to the roller 22 and its other inclined side 30 to the latch 24, and as the tooth enters between the roller and latch it compresses the roller, as clearly indicated in Fig. 3. The reduced end 27 of the latch rides on the surface 30 as the tooth enters between the roller and latch, and enters the socket 28 to lock the tooth securely when it has been moved in far enough, the spring 26 being loaded by the backing up of the latch 24 and serving to move the latch home just as soon as the socket 28 comes into register therewith. The latch 24 is mounted on the end of a rod 31 provided with a knob 32 to permit hand operation of the latch when desired, as, for example, in the installation of the fastener in the ambulance, or in the event the electrical means gets out of commission. The electrical means is a solenoid 33 having an armature 34 fixed on the rod 31 and arranged to withdraw the latch 24 against the action of spring 26 when the coil 35 of the solenoid is energized by the closing of an electrical circuit through battery 36 at either one of the switches 19 and 20. A washer 37 of any suitable cushioning material is provided on the front of the plug 38 to serve as a buffer for the armature 34 and deaden the noise that would otherwise be incident to the operation of the armature 34.

In operation, when the cot is hooked at 14 and swung sidewise into locking position as previously described, the tooth 18 is wedged against the roller 22 and at the same time locked by latch 24. The roller, by reason of its compression, serves the purpose of a spring to urge the cot toward the hook 14 to eliminate play and consequent rattle while the cot is in locked position, and also exerts pressure outwardly on lug 16 tending to swing the cot away from the wall, so that the cot swings out from the wall the instant the same is released by withdrawal of latch 24. That is to say, the roller 22 exerts a pressure on the tooth 18 having two components, one in the direction of latch 24 and hook 14 and one at right angles, outwardly with respect to the wall 6 and housing 21. The first component eliminates play and consequent rattle while the cot is locked, and the second component is responsible for the cot being impelled away from the wall automatically at the instant of its release. This component outwardly on the tooth 18 results from the fact that the roller is compressed by the inclined face 29 of the tooth 18 and the tooth does not quite reach a dead-center position with respect to the axis 23 of the roller. The releasing of the cot is therefore greatly facilitated because the operator does not have to move the cot away from the wall before rolling it away from its engagement with the hook 14.

The installation of these cot fasteners may be facilitated by adjustably mounting the lug 16 on the side bar 9, as clearly indicated in Figs. 4 and 5. Obviously, since it is important to have the socket 28 at exactly the right level with respect to the latch 24, the clamping of the lug 16 by bolts 39 on the clamps 17 entered through vertical slots 40 in the lug will facilitate the application of the lug to the cot and make allowance for any slight error as to elevation in the mounting of the fastener on the side wall of the ambulance. Furthermore, the adjustable mounting of the lug 16 will permit shifting of the lug in the event wear on the tires on wheels 11 should dictate the necessity for such adjustment.

It is believed the foregoing description conveys a good understanding of the objects and advantages of my invention. The appended claims have been drawn with a view to covering all legitimate modifications and adaptations.

I claim:

1. Cot fastening means for vehicles comprising a horizontal hook mounted on a support so as to releasably engage an upright part of a cot disposed alongside said support, a latch on said support spaced from said hook and movable horizontally away from the hook for locking engagement releasably with another part of said cot in longitudinally spaced relation to the first cot part, resilient means on the far side of the latch relative to the hook and placed under load by movement of the cot toward interengagement of the second cot part and latch, said resilient means being so arranged with respect to the aforesaid hook, whereby when it is placed under load in the fastening of the cot it provides two thrust components, one lengthwise with respect to the cot toward the hook so as to hold the cot yieldingly against endwise movement and in tight engagement with the hook, and another component at right angles to the first component tending to move the cot away from the latch support, whereby the cot will move outwardly upon disengagement of the latch from the cot, and means for releasing said latch.

2. Cot fastening means for vehicles comprising a horizontal hook mounted on a support so as to releasably engage one upright part of a cot disposed alongside said support, a latch and rubber buffer means in closely spaced relation on said support, said latch being movable horizontally relative to said hook toward said buffer means for locking engagement releasably with another part of said cot in longitudinally spaced relation to the first cot part, said rubber buffer means being arranged to be placed under compression by the second cot part in the interengagement of the second cot part and latch, said buffer means when under compression exerting a force on said second cot part at an angle to the support, one component of which force tends to hold the cot yieldingly against endwise movement and in tight engagement with said hook so long as the latch holds the cot locked, and another component of which force tends to maintain the cot under constraint to move laterally away from said support and about the aforesaid hook as a fulcrum when said latch is released, and means for releasing the latch.

3. Cot fastening means for vehicles comprising a hook mounted on a support and arranged to releasably engage a part of the cot by endwise movement of the cot toward the hook, a latch mounted on said support spaced from said hook and movable under a spring action normally in one direction for locking engagement releasably with another part of said cot in longitudinally spaced relation to the first cot part, whereby to hold the cot against movement and in engagement with the hook, the latter cot part being so constructed with respect to said latch to cam the latch out of its way in the movement of said part toward locked position, whereby manual manipulation of the latch is dispensed with in fastening the cot, a solenoid for magnetically releasing said latch against the action of said spring means, whereby to eliminate manual manipulation of the latch likewise in unfastening the cot, and a manually operable switch for electrically connecting the solenoid with a source of electrical energy.

4. Cot fastening means for vehicles comprising a hook mounted on a support and arranged to releasably engage a part of the cot by endwise movement of the cot toward the hook and movable under spring action normally in one direction, a latch mounted on said support spaced from said hook for locking engagement releasably with another part of said cot in longitudinally spaced relation to the first cot part, whereby to hold the cot against movement and in engagement with the hook, the latter cot part being so constructed with respect to said latch to cam the latch out of its way in the movement of said part toward locked position, whereby manual manipulation of the latch is dispensed with in fastening the cot, a solenoid for magnetically releasing said latch against the action of said spring means, whereby to eliminate manual manipulation of the latch likewise in unfastening the cot, and a plurality of manually operable switches differently located at remote points with reference to said solenoid and latch and operable selectively to electrically connect the solenoid with a source of electrical energy, whereby to permit unfastening of the cot from any one of several different stations, as desired.

5. Cot fastening means for vehicles comprising a hook mounted on a support and arranged to releasably engage a part of the cot by endwise movement of the cot toward the hook and movable under spring action normally in one direction, a latch mounted on said support spaced from said hook for locking engagement releasably with another part of said cot in longitudinally spaced relation to the first cot part, whereby to hold the cot against movement and in engagement with the hook, the latter cot part being so constructed with respect to said latch to cam the latch out of its way in the movement of said part toward locked position, whereby manual manipulation of the latch is dispensed with in fastening the cot, a solenoid for magnetically releasing said latch against the action of said spring means, whereby to eliminate manual manipulation of the latch likewise in unfastening the cot, said latch having a portion extending from the solenoid adapted to be manually operated, independently of energization of said solenoid, to move the latch to released position against the action of said spring means, whereby to permit manual operation of the latch in event of failure of the solenoid to function in an emergency, and a manually operable switch remotely disposed with respect to said solenoid and latch and arranged to electrically connect the solenoid with a source of electrical energy.

6. Cot fastening means for vehicles comprising a hook mounted on a support and arranged to be engaged by one part of a cot to hold the cot against movement relative to said support, a spring pressed latch movably mounted on said support in spaced relation to the hook and so constructed and arranged with respect to another part of the cot spaced longitudinally from the first part to automatically lock said part when the cot is moved toward said support about said hook as a fulcrum, a solenoid adjacent said latch for automatically releasing the same magnetically, and switch means remote from the latch and solenoid for energizing the solenoid by electrically connecting the same with a source of electrical energy.

7. Cot fastening means as set forth in claim 6 including manually operable means directly connected with the latch for moving the same to released position independently of energization of the solenoid.

8. Cot fastening means as set forth in claim 6 including spring action means placed under load by movement of the cot in the interengagement of the second cot part and latch so as to maintain the locked cot under constraint to move toward the hook so as to hold the first cot part in tighter engagement with the hook, whereby to prevent movement of the cot relative to the support while locked.

9. Cot fastening means as set forth in claim 6 including spring action means placed under load by movement of the cot in the interengagement of the second cot part and latch so as to maintain the locked cot under constraint in two directions, first, to move endwise toward the hook so that the first cot part is more tightly engaged with the hook, whereby to prevent movement of the cot relative to the support while locked, and, second, to move away from said support about the hook as a fulcrum when said latch is released.

10. Fastening means for a cot or the like having an upright member at one end thereof and a lug projecting laterally therefrom in longitudinally spaced relation to the upright member, the lug having a locking recess provided therein, said fastening means comprising a hook suitably supported horizontally for reception of the upright member, and locking means suitably supported in spaced relation to the hook in registration with said lug, said locking means comprising a support, a latch slidable on said support toward and away from the lug and arranged to engage in the recess in said lug, said latch tending normally to move toward the lug for locking purposes, a solenoid in juxtaposition to said latch to move the same magnetically to released position, and manually operable switch means remotely disposed relative to the solenoid and latch to energize the solenoid by electrically connecting the same with a source of electrical energy.

11. A structure as set forth in claim 10 including a manually operable part moving with said latch and arranged to be operated independently of energization of the solenoid for direct release of the latch.

12. Fastening means for a cot or the like having an upright member at one end thereof and a lug projecting laterally therefrom in longitudinally spaced relation to the upright member, the lug having a locking recess provided therein, said fastening means comprising a hook suitably supported horizontally for reception of the upright member, and locking means suitably supported in spaced relation to the hook in registration with said lug, said locking means comprising a support, a latch slidable horizontally on said support toward one side of the lug to engage in the recess therein, spring means normally urging said latch toward the lug, a rubber buffer mounted on said support for engagement with the other side of said lug and arranged to be compressed by the lug in the movement thereof to locking position, in such a way as to forcibly expel said lug when the latch is released, and means for moving said latch to released position against the action of the spring means.

13. Fastening means for a cot or the like having an upright member at one end thereof and a lug projecting laterally therefrom in longitudinally spaced relation to the upright member, the lug having a locking recess provided therein, said fastening means comprising a hook suitably supported horizontally for reception of the upright member, and locking means suitably supported in spaced relation to the hook in registration with said lug, said locking means comprising a support, a latch slidable on said support toward one side of the lug to engage in the recess therein, spring means normally urging said latch toward the lug, a rubber roller rotatably mounted on said support on a vertical axis for engagement with the other side of said lug, said lug having a wedging surface on that side for engagement with said roller to compress the roller in the movement of the lug toward locked position, whereby said roller serves to forcibly expel the lug away from said support when the latch is released, and means for moving said latch to released position against the action of the spring means.

14. Fastening means for a cot or the like having an upright member at one end thereof and a lug projecting laterally therefrom in longitudinally spaced relation to the upright member, the lug having a locking recess provided therein, said fastening means comprising a hook suitably supported horizontally for reception of the upright member, and locking means suitably supported in spaced relation to the hook in registration with said lug, said locking means comprising a support, a roller of compressible resilient material rotatably mounted on said support to turn on a vertical axis, a latch slidable horizontally on said support for movement toward and away from said roller, spring means normally urging the latch toward the roller, the aforesaid lug being wedge shaped and arranged to move in between the roller and latch so as to present one wedging surface to the roller to compress the same in the movement of the lug toward locking position, whereby said roller serves to forcibly eject the lug from locked position when released, the other wedging surface of said lug being arranged to slidably engage the end of said latch in moving toward locked position and having the locking recess therein to receive the latch in a predetermined position of the lug with respect to the roller, and means for moving said latch to released position.

15. Fastening means for a cot or the like having a lug projecting laterally therefrom, the lug having a locking recess provided therein, said fastening means comprising a support arranged to register with said lug, a latch slidable on said support toward and away from the lug and arranged to engage in the recess in said lug, said latch tending normally to move toward the lug for locking purposes, a solenoid in juxtaposition to said latch to move the same magnetically to released position, and manually operable switch means remotely disposed relative to the solenoid and latch to energize the solenoid by electrically connecting the same with a source of electrical energy.

16. Fastening means for a cot or the like having a lug projecting laterally therefrom, the lug having a locking recess provided therein, said fastening means comprising a support arranged to register with said lug, a latch slidable on said support toward one side of the lug to engage in the recess therein, spring means normally urging said latch toward the lug, a rubber buffer mounted on said support for engagement with the other side of said lug and arranged to be compressed by the lug in the movement thereof to locking position, in such a way as to forcibly expel said lug when the latch is released, and means for moving said latch to released position against the action of the spring means.

17. Fastening means for a cot or the like having a lug projecting laterally therefrom, the lug having a locking recess provided therein, said fastening means comprising a support arranged to register with said lug, a latch slidable on said support toward one side of the lug to engage in the recess therein, spring means normally urging said latch toward the lug, a rubber roller rotatably mounted on said support for engagement with the other side of said lug, said lug having a wedging surface on that side for engagement with said roller to compress the roller in the movement of the lug toward locked position, whereby said roller serves to forcibly expel the lug away from said support when the latch is released, and means for moving said latch to released position against the action of the spring means.

18. Fastening means for a cot or the like having a lug projecting laterally therefrom, the lug having a locking recess provided therein, said fastening means comprising a support arranged to register with said lug, a roller of compressible resilient material rotatably mounted on said support to turn, a latch slidable on said support for movement toward and away from said roller, spring means normally urging the latch toward the roller, the aforesaid lug being wedge shaped and arranged to move in between the roller and latch so as to present one wedging surface to the roller to compress the same in the movement of the lug toward locking position, whereby said roller serves to forcibly eject the lug from locked position when released, the other wedging surface of said lug being arranged to slidably engage the end of said latch in moving toward locked position and having the locking recess therein to receive the latch in a predetermined position of the lug with respect to the roller, and means for moving said latch to released position.

19. Fastening means for a cot or the like having a frame member at one end thereof and a laterally projecting part in longitudinally spaced relation to said frame member, said part having a locking recess provided thereon, said fastening means comprising a keeper constructed for quick detachable connection with the frame member, and locking means suitably supported in spaced relation to the keeper for registration with said laterally projecting part, said locking means comprising a support, a latch slidable thereon normally toward one side of the cot part to engage in the recess thereof, a rubber roller rotatably mounted on said support for engagement with the other side of the cot part, the cot part having an inclined surface on that side for wedging engagement with the roller to compress the roller in the movement of the part toward locked position, whereby said roller serves to forcibly repel the cot part when the latch is released, and means for releasing said latch.

20. Fastening means for a cot or the like having a frame member at one end thereof and a laterally projecting part in longitudinally spaced relation to said frame member, the latter being wedge-shaped and having a locking recess provided on one side thereof, said fastening means comprising a keeper constructed for quick detachable connection with the frame member, and locking means suitably supported in spaced relation to the keeper for registration with said laterally projecting part, said locking means comprising a support, a latch slidable on said support, spring means normally urging the latch toward one side of the wedge-shaped cot part, a roller of compressible resilient material rotatably mounted on said support for engagement with the other side of said cot part and arranged to be compressed by the wedging of the cot part between it and the latch whereby to forcibly repel said part from locked position when the latch is released, the latch being arranged to engage in the recess in said part when the part has compressed said roller, and means for releasing said latch.

21. A detachable fastening device on one member for cooperation with a lug on another member to be detachably fastened to the first member, the lug having a locking recess provided thereon, said device comprising a support arranged to register with said lug when the members are in coupling relation, a latch slidable on said support toward and away from the lug and movable normally toward the lug for engagement in the recess thereof, a compressible resilient buffer mounted on said support for engagement by said lug and arranged to be compressed in the movement thereof to locking position, whereby to forcibly repel said lug when the latch is released, and means for releasing said latch.

22. A detachable fastening device on one member for cooperation with a lug on another member to be detachably fastened to the first member, the lug having a locking recess provided thereon, said device comprising a support arranged to register with said lug when the members are in coupling relation, a latch slidable on said support toward and away from the lug and movable normally toward the lug for engagement in the recess thereof, a compressible resilient buffer mounted on said support for engagement by said lug and arranged to be compressed in the movement thereof to locking position, whereby to forcibly repel said lug when the latch is released, a solenoid in juxtaposition to said latch to move the same magnetically to released position, and manually operable switch means for energizing the solenoid by electrically connecting the same with a source of electrical energy.

23. A detachable fastening device for cooperation with a wedge-shaped lug, the lug having a locking recess provided in one side thereof, said device comprising a support arranged to register with the lug, a latch slidable on said support under spring action toward one side of the lug for engagement in the recess thereof, a rubber roller rotatably mounted on said support for wedging engagement with the other side of said lug, whereby said roller is arranged to be compressed in the movement of the lug toward locked position and serves to forcibly repel the lug when the latch is released, and means for releasing said latch.

24. A detachable fastening device for cooperation with a wedge-shaped lug, the lug having a locking recess provided in one side thereof, said device comprising a support arranged to register with the lug, a latch slidable on said support under spring action toward one side of the lug for engagement in the recess thereof, a rubber roller rotatably mounted on said support for wedging engagement with the other side of said lug, whereby said roller is arranged to be compressed in the movement of the lug toward locked position and serves to forcibly repel the lug when the latch is released, a solenoid in juxtaposition to said latch to move the same magnetically to released position, and manually operable switch means for energizing the solenoid by electrically connecting the same with a source of electrical energy.

25. Detachable coupling means for detachably fastening one member to another, the detachable coupling means comprising an upright part on one member and a lug projecting laterally therefrom in longitudinally spaced relation to the upright part and having a locking recess provided therein, the coupling means further comprising a hook suitably supported horizontally on the other member for reception of the upright part, and locking means on the same member suitably supported in spaced relation to the hook and arranged to register with the lug when the members are in coupling relation, said locking means comprising a support, a latch slidable horizontally on said support toward one side of the lug to engage in the recess therein, spring means normally urging said latch toward the lug, a rubber buffer mounted on said support for engagement with the other side of said lug and arranged to be compressed by the lug in the movement thereof to locking position, in such a way as to forcibly expel said lug when the latch is released, and means for moving said latch to released position against the action of the spring means.

26. Detachable coupling means for detachably fastening one member to another, the detachable coupling means comprising an upright part on one member and a lug projecting laterally therefrom in longitudinally spaced relation to the upright part and having a locking recess provided therein, the coupling means further comprising a hook suitably supported horizontally on the other member for reception of the upright part, and locking means on the same member suitably supported in spaced relation to the hook and arranged to register with the lug when the members are in coupling relation, said locking means comprising a support, a latch slidable on said support toward one side of the lug to engage in the recess therein, spring means normally urging said latch toward the lug, a rubber roller rotatably mounted on said support on a vertical axis for engagement with the other side of said lug, said lug having a wedging surface on that side for engagement with said roller to compress the roller in the movement of the lug toward locked position, whereby said roller serves to forcibly expel the lug away from said support when the latch is released, and means for moving said latch to released position against the action of the spring means.

27. Detachable coupling means for detachably fastening one member to another, the detachable coupling means comprising an upright part on one member and a lug projecting laterally therefrom in longitudinally spaced relation to the upright part and having a locking recess provided therein, the coupling means further comprising a hook suitably supported horizontally on the other member for reception of the upright part, and locking means on the same member suitably supported in spaced relation to the hook and arranged to register with the lug when the members are in coupling relation, said locking means comprising a support, a roller of compressible resilient material rotatably mounted on said support to turn on a vertical axis, a latch slidable horizontally on said support for movement toward and away from said roller, spring means normally urging the latch toward the roller, the aforesaid lug being wedge shaped and arranged to move in between the roller and latch so as to present one wedging surface to the roller to compress the same in the movement of the lug toward locking position, whereby said roller serves to forcibly eject the lug from locked position when released, the other wedging surface of said lug being arranged to slidably engage the end of said latch in moving toward locked position and having the locking recess therein to receive the latch in a predetermined position of the lug with respect to the roller, and means for moving said latch to released position.

28. Detachable coupling means for detachably fastening one member to another, said coupling means comprising a lug on one member having a locking recess provided therein, and a support on the other member arranged to register with said lug when the members are in coupling relation, a latch slidable on said support toward and away from the lug and arranged to engage in the recess in said lug, said latch tending normally to move toward the lug for locking purposes, a solenoid in juxtaposition to said latch to move the same magnetically to released position, and manually operable switch means remotely disposed relative to the solenoid and latch to energize the solenoid by electrically connecting the same with a source of electrical energy.

29. Detachable coupling means for detachably fastening one member to another, said coupling means comprising a lug on one member having a locking recess provided therein, and a support on the other member arranged to register with said lug when the members are in coupling relation, a latch slidable on said support toward one side of the lug to engage in the recess therein, spring means normally urging said latch toward the lug, a rubber buffer mounted on said support for engagement with the other side of said lug and arranged to be compressed by the lug in the movement thereof to locking position, in such a way as to forcibly expel said lug when the latch is released, and means for moving said latch to released position against the action of the spring means.

30. Detachable coupling means for detachably fastening one member to another, said coupling means comprising a lug on one member having a locking recess provided therein, and a support on the other member arranged to register with said lug when the members are in coupling relation, a latch slidable on said support toward one side of the lug to engage in the recess therein, spring means normally urging said latch toward the lug, a rubber roller rotatably mounted on said support for engagement with the other side of said lug, said lug having a wedging surface on that side for engagement with said roller to compress the roller in the movement of the lug toward locked position, whereby said roller serves to forcibly expel the lug away from said support when the latch is released, and means for moving said latch to released position against the action of the spring means.

31. Detachable coupling means for detachably fastening one member to another, said coupling means comprising a lug on one member having a locking recess provided therein, and a support on the other member arranged to register with said lug when the members are in coupling relation, a latch slidable on said support for movement toward and away from said roller, spring means normally urging the latch toward the roller, the aforesaid lug being wedge shaped and arranged to move in between the roller and latch so as to present one wedging surface to the roller to compress the same in the movement of the lug toward locking position, whereby said roller serves to forcibly eject the lug from locked position when released, the other wedging surface of said lug being arranged to slidably engage the end of said latch in moving toward locked position and having the locking recess therein to receive the latch in a predetermined position of the lug with respect to the roller, and means for moving said latch to released position.

GEORGE LA VERNE RUNKLE.

CERTIFICATE OF CORRECTION.

Patent No. 2,076,866.                                                April 13, 1937.

GEORGE LA VERNE RUNKLE.

It is hereby certified that error appears in the printed specification of the above numbered patent requiring correction as follows: Page 2, second column, lines 65, 66 and 67, and page 3, first column, lines 16, 17 and 18, claims 4 and 5 respectively, strike out the words "and movable under spring action normally in one direction" and insert the same after "hook" page 2, second column, line 68, and page 3, first column, line 19, claims 4 and 5 respectively; and that the said Letters Patent should be read with these corrections therein that the same may conform to the record of the case in the Patent Office.

Signed and sealed this 27th day of July, A. D. 1937.

Henry Van Arsdale (Seal)                                              Acting Commissioner of Patents.